US010764539B2

(12) United States Patent
Burke et al.

(10) Patent No.: US 10,764,539 B2
(45) Date of Patent: Sep. 1, 2020

(54) SYSTEM AND METHOD FOR USING MOBILE DEVICE OF ZONE AND CORRELATED MOTION DETECTION

(71) Applicant: Sensormatic Electronics, LLC, Boca Raton, FL (US)

(72) Inventors: Anthony Burke, Noblesville, IN (US); Peter Joseph Birkel, Noblesville, IN (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 264 days.

(21) Appl. No.: 15/076,710

(22) Filed: Mar. 22, 2016

(65) Prior Publication Data

US 2017/0280103 A1      Sep. 28, 2017

(51) Int. Cl.
*H04N 7/18*       (2006.01)
*H04N 5/232*     (2006.01)

(52) U.S. Cl.
CPC ......... *H04N 7/181* (2013.01); *H04N 5/23206* (2013.01); *H04N 5/23222* (2013.01); *H04N 5/23296* (2013.01)

(58) Field of Classification Search
CPC .............. H04N 7/181; H04N 5/23206; H04N 5/23296; H04N 5/23222
See application file for complete search history.

(56) References Cited

U.S. PATENT DOCUMENTS

| 3,217,098 A | 11/1965 | Oswald |
| 4,940,925 A | 7/1990 | Wand et al. |
| 5,164,827 A | 11/1992 | Paff |

(Continued)

FOREIGN PATENT DOCUMENTS

| EP | 2 164 003 A1 | 3/2010 |
| EP | 2 538 672 A1 | 12/2012 |

(Continued)

OTHER PUBLICATIONS

International Search Report and the Written Opinion of the International Searching Authority, dated May 31, 2017, from International Application No. PCT/US2017/023430, filed Mar. 21, 2017. Fourteen pages.

(Continued)

*Primary Examiner* — Joseph W Becker
(74) *Attorney, Agent, or Firm* — HoustonHogle LLP

(57) ABSTRACT

A system and method for determining relationships between fields of views of surveillance cameras is disclosed. In the system, a user device such as a mobile phone receives image data from the cameras, and an analytics system of the user device analyzes the image data to determine the relationships between the fields of views of the surveillance cameras. The relationships include overlap among fields of view of at least two of the cameras and deadzones, where deadzones are areas monitored by the cameras that are not included within any of the fields of view of any of the cameras. In a preferred embodiment, the surveillance cameras capture image data of a scene while an installer holding the user device walks one or more critical paths through the scene. The user device then analyzes image data from the cameras during the critical path definition to determine any overlap and/or deadzones.

19 Claims, 12 Drawing Sheets

(56) References Cited

U.S. PATENT DOCUMENTS

| | | |
|---|---|---|
| 5,204,536 A | 4/1993 | Vardi |
| 5,317,394 A | 5/1994 | Hale et al. |
| 5,729,471 A | 3/1998 | Jain et al. |
| 5,850,352 A | 12/1998 | Moezzi et al. |
| 5,940,538 A | 8/1999 | Spiegel et al. |
| 5,951,695 A | 9/1999 | Kolovson |
| 5,969,755 A | 10/1999 | Courtney |
| 6,341,183 B1 | 1/2002 | Goldberg |
| 6,359,647 B1 | 3/2002 | Sengupta et al. |
| 6,581,000 B2 | 6/2003 | Hills et al. |
| 6,643,795 B1 | 11/2003 | Sicola et al. |
| 6,724,421 B1 | 4/2004 | Glatt |
| 6,812,835 B2 | 11/2004 | Ito et al. |
| 6,970,083 B2 | 11/2005 | Venetianer et al. |
| 7,091,949 B2 | 8/2006 | Hansen |
| 7,242,423 B2 | 7/2007 | Lin |
| 7,286,157 B2 | 10/2007 | Buehler |
| 7,342,489 B1 | 3/2008 | Milinusic et al. |
| 7,382,244 B1 | 6/2008 | Donovan et al. |
| 7,409,076 B2 | 8/2008 | Brown et al. |
| 7,428,002 B2 | 9/2008 | Monroe |
| 7,450,735 B1 | 11/2008 | Shah et al. |
| 7,456,596 B2 | 11/2008 | Goodall et al. |
| 7,460,149 B1 | 12/2008 | Donovan et al. |
| 7,529,388 B2 | 5/2009 | Brown et al. |
| 7,623,152 B1 | 11/2009 | Kaplinsky |
| 7,623,676 B2 | 11/2009 | Zhao et al. |
| 7,733,375 B2 | 6/2010 | Mahowald |
| 7,996,718 B1 | 8/2011 | Ou et al. |
| 8,249,301 B2 | 8/2012 | Brown et al. |
| 8,300,102 B2 | 10/2012 | Nam et al. |
| 8,325,979 B2 | 12/2012 | Taborowski et al. |
| 8,482,609 B1 | 7/2013 | Mishra et al. |
| 8,483,490 B2 | 7/2013 | Brown et al. |
| 8,502,868 B2 | 8/2013 | Buehler et al. |
| 8,558,907 B2 | 10/2013 | Goh et al. |
| 8,594,482 B2 | 11/2013 | Fan et al. |
| 8,675,074 B2 | 3/2014 | Salgar et al. |
| 8,723,952 B1 | 5/2014 | Rozenboim |
| 8,849,764 B2 | 9/2014 | Long et al. |
| 8,995,712 B2 | 3/2015 | Huang et al. |
| 9,015,167 B1 | 4/2015 | Ballou et al. |
| 9,058,520 B2 | 6/2015 | Xie et al. |
| 9,094,615 B2 | 7/2015 | Aman et al. |
| 9,129,179 B1 | 9/2015 | Wong |
| 9,158,975 B2 | 10/2015 | Lipton et al. |
| 9,168,882 B1 | 10/2015 | Mirza et al. |
| 9,197,861 B2 | 11/2015 | Saptharishi et al. |
| 9,280,833 B2 | 3/2016 | Brown et al. |
| 9,412,269 B2 | 8/2016 | Saptharishi et al. |
| 9,495,614 B1 | 11/2016 | Boman et al. |
| 9,594,963 B2 | 3/2017 | Bobbitt et al. |
| 9,641,763 B2 | 5/2017 | Bernal et al. |
| 9,674,458 B2 | 6/2017 | Teich et al. |
| 9,785,898 B2 | 10/2017 | Hofman et al. |
| 9,860,554 B2 | 1/2018 | Samuelsson et al. |
| 9,965,680 B2 | 5/2018 | Burke et al. |
| 9,967,446 B2 | 5/2018 | Park |
| 2002/0104098 A1 | 8/2002 | Zustak et al. |
| 2003/0107649 A1 | 6/2003 | Flickner et al. |
| 2003/0169337 A1 | 9/2003 | Wilson et al. |
| 2005/0012817 A1 | 1/2005 | Hampapur et al. |
| 2005/0057653 A1 | 3/2005 | Maruya |
| 2006/0001742 A1 | 1/2006 | Park |
| 2006/0173856 A1 | 8/2006 | Jackson et al. |
| 2006/0181612 A1 | 8/2006 | Lee et al. |
| 2006/0239645 A1 | 10/2006 | Curtner et al. |
| 2006/0243798 A1 | 11/2006 | Kundu et al. |
| 2007/0178823 A1 | 8/2007 | Aronstam et al. |
| 2007/0182818 A1 | 8/2007 | Buehler |
| 2007/0279494 A1 | 12/2007 | Aman et al. |
| 2007/0294207 A1 | 12/2007 | Brown et al. |
| 2008/0004036 A1 | 1/2008 | Bhuta et al. |
| 2008/0101789 A1 | 5/2008 | Sharma |
| 2008/0114477 A1 | 5/2008 | Wu |
| 2008/0158336 A1 | 7/2008 | Benson et al. |
| 2009/0237508 A1 | 9/2009 | Arpa et al. |
| 2009/0268033 A1 | 10/2009 | Ukita |
| 2009/0273663 A1 | 11/2009 | Yoshida |
| 2009/0284601 A1* | 11/2009 | Eledath .......... G06K 9/209 348/157 |
| 2010/0013917 A1 | 1/2010 | Hanna et al. |
| 2010/0110212 A1 | 5/2010 | Kuwahara et al. |
| 2010/0153182 A1 | 6/2010 | Quinn et al. |
| 2010/0232288 A1 | 9/2010 | Coatney et al. |
| 2011/0043631 A1 | 2/2011 | Marman et al. |
| 2011/0128384 A1 | 6/2011 | Tiscareno et al. |
| 2011/0246626 A1 | 10/2011 | Peterson et al. |
| 2011/0289119 A1 | 11/2011 | Hu et al. |
| 2011/0289417 A1 | 11/2011 | Schaefer et al. |
| 2011/0320861 A1 | 12/2011 | Bayer et al. |
| 2012/0072420 A1 | 3/2012 | Moganti et al. |
| 2012/0098969 A1 | 4/2012 | Wengrovitz et al. |
| 2012/0206605 A1 | 8/2012 | Buehler et al. |
| 2012/0226526 A1 | 9/2012 | Donovan et al. |
| 2013/0106977 A1* | 5/2013 | Chu .......... H04M 3/568 348/14.02 |
| 2013/0166711 A1* | 6/2013 | Wang .......... H04N 7/181 709/223 |
| 2013/0169801 A1 | 7/2013 | Martin et al. |
| 2013/0223625 A1 | 8/2013 | de Waal et al. |
| 2013/0278780 A1 | 10/2013 | Cazier et al. |
| 2013/0343731 A1 | 12/2013 | Pashkevich et al. |
| 2014/0085480 A1 | 3/2014 | Saptharishi |
| 2014/0172627 A1 | 6/2014 | Levy et al. |
| 2014/0211018 A1 | 7/2014 | de Lima et al. |
| 2014/0218520 A1 | 8/2014 | Teich et al. |
| 2014/0282991 A1 | 9/2014 | Watanabe et al. |
| 2014/0330729 A1 | 11/2014 | Colangelo |
| 2014/0362223 A1 | 12/2014 | LaCroix et al. |
| 2015/0039458 A1 | 2/2015 | Reid |
| 2015/0092052 A1 | 4/2015 | Shin et al. |
| 2015/0121470 A1 | 4/2015 | Rongo et al. |
| 2015/0208040 A1 | 7/2015 | Chen et al. |
| 2015/0215583 A1* | 7/2015 | Chang .......... H04N 7/181 348/159 |
| 2015/0244992 A1 | 8/2015 | Buehler |
| 2015/0249496 A1 | 9/2015 | Muijs et al. |
| 2015/0294119 A1 | 10/2015 | Gundam et al. |
| 2015/0358576 A1 | 12/2015 | Hirose et al. |
| 2015/0379729 A1 | 12/2015 | Datta et al. |
| 2015/0381946 A1 | 12/2015 | Renkis |
| 2016/0014381 A1 | 1/2016 | Rolf et al. |
| 2016/0065615 A1 | 3/2016 | Scanzano et al. |
| 2016/0224430 A1 | 8/2016 | Long et al. |
| 2016/0225121 A1 | 8/2016 | Gupta et al. |
| 2016/0269631 A1 | 9/2016 | Jiang et al. |
| 2016/0357648 A1 | 12/2016 | Keremane et al. |
| 2016/0379074 A1* | 12/2016 | Nielsen .......... G06K 9/3241 348/143 |
| 2017/0193673 A1 | 7/2017 | Heidemann et al. |
| 2017/0277785 A1 | 9/2017 | Burke |
| 2017/0277947 A1 | 9/2017 | Burke et al. |
| 2017/0277967 A1 | 9/2017 | Burke et al. |
| 2017/0278137 A1 | 9/2017 | Burke |
| 2017/0278365 A1 | 9/2017 | Madar et al. |
| 2017/0278366 A1 | 9/2017 | Burke et al. |
| 2017/0278367 A1 | 9/2017 | Burke et al. |
| 2017/0278368 A1 | 9/2017 | Burke |
| 2017/0280043 A1 | 9/2017 | Burke et al. |
| 2017/0280102 A1 | 9/2017 | Burke |
| 2018/0218209 A1 | 8/2018 | Burke et al. |

FOREIGN PATENT DOCUMENTS

| | | |
|---|---|---|
| JP | 2003151048 A | 5/2003 |
| JP | 2010074382 A | 4/2010 |
| WO | 2007/030168 A1 | 3/2007 |
| WO | 2013/141742 A1 | 9/2013 |
| WO | 2014/114754 A1 | 7/2014 |

(56) References Cited

OTHER PUBLICATIONS

International Search Report and the Written Opinion of the International Searching Authority, dated Jun. 12, 2017, from International Application No. PCT/US2017/023440, filed on Mar. 21, 2017. Fourteen pages.
International Search Report and the Written Opinion of the International Searching Authority, dated Jun. 19, 2017, from International Application No. PCT/US2017/023436, filed on Mar. 21, 2017. Fourteen pages.
International Search Report and the Written Opinion of the International Searching Authority, dated Jun. 21, 2017, from International Application No. PCT/US2017/023444, filed on Mar. 21, 2017. Thirteen pages.
International Search Report and the Written Opinion of the International Searching Authority, dated Jun. 28, 2017, from International Application No. PCT/US2017/023434, filed on Mar. 21, 2017. Thirteen pages.
International Preliminary Report on Patentability, dated Oct. 4, 2018, from International Application No. PCT/US2017/023440, filed on Mar. 21, 2017. Eight pages.
International Preliminary Report on Patentability, dated Oct. 4, 2018, from International Application No. PCT/US2017/023434, filed on Mar. 21, 2017. Eight pages.
International Preliminary Report on Patentability, mailed on Oct. 4, 2018, from International Application No. PCT/US2017/023430, filed Mar. 21, 2017. Eight pages.
International Preliminary Report on Patentability, dated Oct. 4, 2018, from International Application No. PCT/US2017/023436, filed on Mar. 21, 2017. Eight pages.

* cited by examiner

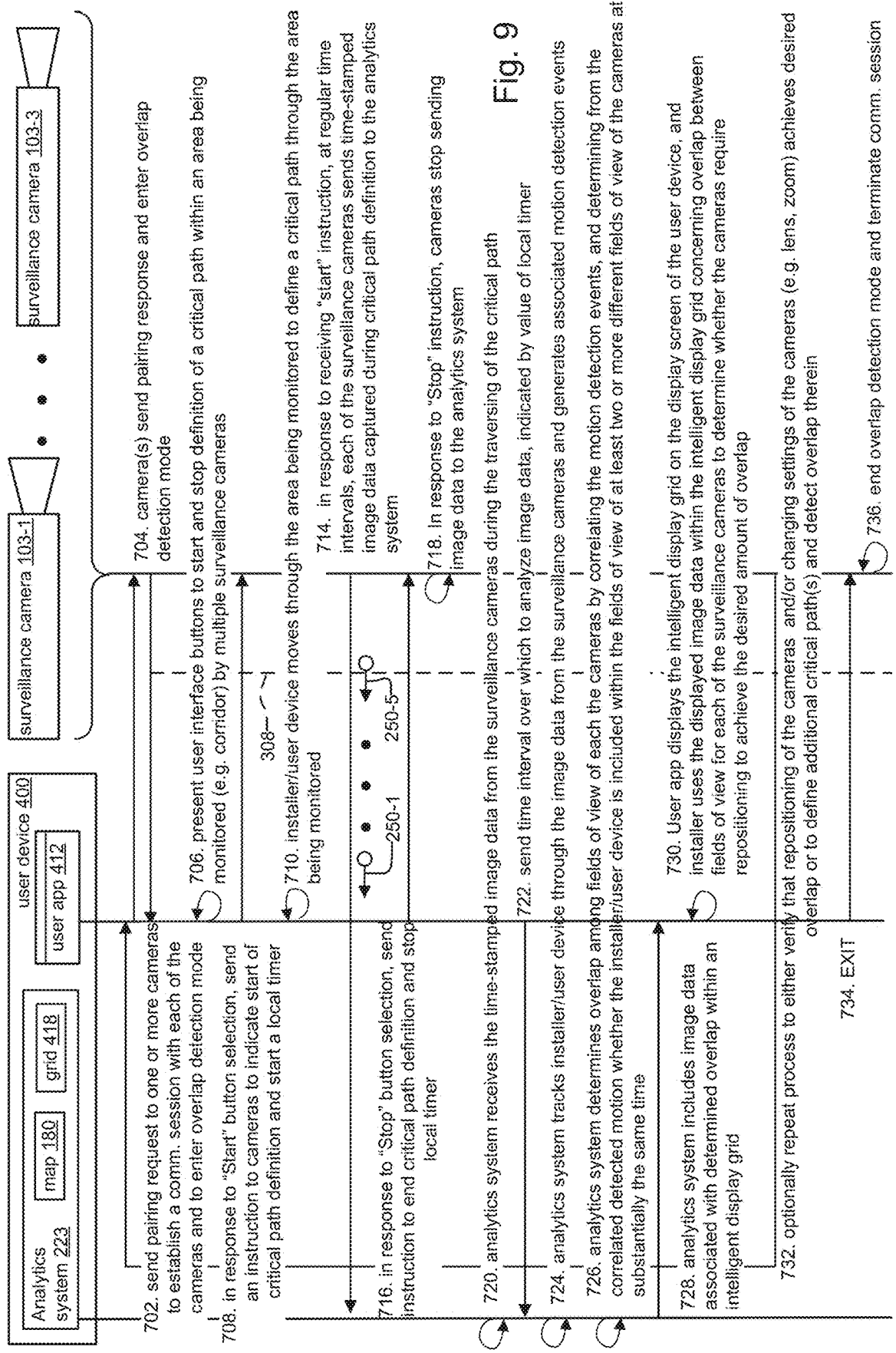

SYSTEM AND METHOD FOR USING MOBILE DEVICE OF ZONE AND CORRELATED MOTION DETECTION

RELATED APPLICATIONS

This application is related to:

U.S. application Ser. No. 15/076,701 filed on Mar. 22, 2016, entitled "Method and system for surveillance camera arbitration of uplink consumption," now U.S. Patent Publication No.: 2017/0278368 A1;

U.S. application Ser. No. 15/076,703 filed on Mar. 22, 2016, entitled "Method and system for pooled local storage by surveillance cameras," now U.S. Patent Publication No.: 2017/0280102 A1;

U.S. application Ser. No. 15/076,704 filed on Mar. 22, 2016, entitled "System and method for designating surveillance camera regions of interest," now U.S. Patent Publication No.: 2017/0277967 A1;

U.S. application Ser. No. 15/076,705 filed on Mar. 22, 2016, entitled "System and method for deadzone detection in surveillance camera network," now U.S. Patent Publication No.: 2017/0278366 A1;

U.S. application Ser. No. 15/076,706 filed on Mar. 22, 2016, entitled "System and method for overlap detection in surveillance camera network," now U.S. Patent Publication No.: 2017/0278367 A1;

U.S. application Ser. No. 15/076,708 filed on Mar. 22, 2016, entitled "System and method for retail customer tracking in surveillance camera network," now U.S. Patent Publication No.: 2017/0278137 A1:

U.S. application Ser. No. 15/076,709 filed on Mar. 22, 2016, entitled "Method and system for modeling image of interest to users," now U.S. Patent Publication No.: 2017/0277785 A1;

U.S. application Ser. No. 15/076,712 filed on Mar. 22, 2016, entitled "Method and system for conveying data from monitored scene via surveillance cameras," now U.S. Patent Publication No.: 2017/0277947 A1;

U.S. application Ser. No. 15/076,713 filed on Mar. 22, 2016, entitled "System and method for configuring surveillance cameras using mobile computing devices," now U.S. Patent Publication No.: 2017/0278365 A1:

and

U.S. application Ser. No. 15/076,717 filed on Mar. 22, 2016, entitled "System and method for controlling surveillance cameras," now U.S. Patent Publication No.: 2017/0280043 A1.

All of the afore-mentioned applications are incorporated herein by this reference in their entirety.

BACKGROUND OF THE INVENTION

Surveillance camera systems are often deployed to collect image data within or around premises. Examples of premises include governmental buildings, office buildings, retail establishments, and single and multi-unit residences. The cameras are typically installed to monitor and detect individuals and/or activities at different locations in and around the premises.

A successful installation of surveillance camera systems requires careful consideration of several factors. The designers/installers select the locations in which to install the cameras, select the type of camera that is best suited for each location, and then position the cameras' fields of view to capture scenes at each location. For example, point of sale areas might require one or more ceiling mounted, dome style cameras to capture transaction-related activities within the locations. For monitoring large open areas such as shopping malls, open-floor plan offices, and parking lots, either panoramic view (e.g. "fish eye") cameras or pan-tilt-zoom (PTZ) cameras are often utilized because of each camera's ability to provide wider fields of view and to scan the areas, respectively. Designers/installers might also position the fields of view of different surveillance cameras to overlap, and also position the field of view of one camera to include another surveillance camera. These actions provide different views or perspectives of the same scene and the ability to capture attempts at tampering with the surveillance cameras.

Analytics systems are often part of surveillance camera systems. At a basic level, the analytics systems provide the ability to detect and track individuals and objects within the image data of the monitored scenes. Other capabilities include the ability to determine motion of objects relative to visual cues superimposed upon the image data and to search for specific behaviors of interest within the image data. The visual cues are often placed near fixed objects in the background scene of the image data to infer motion of objects relative to the visual cues. In one example, virtual tripwire visual cues can be located near entryways within the scene to detect entry or exit of individuals through the entryways and to provide a count of the individuals passing through the entryway over a specific time period. These analytics systems can provide both real-time analysis of live image data and forensic analysis of previously recorded image data.

SUMMARY OF THE INVENTION

A common problem when installing surveillance cameras is the potential for deadzones. Deadzones are areas in the premises that are not included within any of the fields of view of any of the cameras. These deadzones might result from improper positioning of the cameras and/or improper selection of the type of cameras installed. On the other hand, the existence of deadzones might simply be the consequence of a limited budget and the fact that deploying enough cameras to achieve total coverage is not feasible. At the same time, deadzones can result when there are obstructions present in the scenes of the cameras. Obstructions within the scenes such as pylons, bookcases, cubicle walls, file cabinets, and stairwells can cause areas behind the obstructions to be hidden from view. These deadzones remain unless additional cameras can be added that provide different views of the obstructed areas. It would be beneficial to determine locations of deadzones during the installation of the surveillance cameras. In contrast, installers of current surveillance camera systems typically use an "educated guess" approach for installing surveillance cameras to provide the desired security coverage while also minimizing the presence of deadzones, where the experience of the installer is paramount to achieving this objective.

It would also be beneficial to infer the presence of deadzones from image data captured by the surveillance cameras. Such a capability enables operators to better understand image data from existing surveillance cameras installations and to better interpret that image data.

Additionally, it would also be beneficial to determine overlap among fields of view of surveillance cameras during the installation of the surveillance cameras using an analytics system, for example. In contrast, installers of current surveillance camera systems might typically use an "educated guess" approach for installing surveillance cameras to provide the desired level of overlap among the fields of view, where the experience of the installer is paramount to achieving this objective.

Finally, it would also be beneficial to infer overlap among fields of view of surveillance cameras from image data captured by the surveillance cameras. Such a capability could allow system operators to better interpret image data from different cameras. Moreover, the analytics systems could use this information to present image data to operators in a way that is easier to grasp context.

The present invention provides for the ability to analyze image data from multiple surveillance cameras either in realtime or forensically, for example. It does this analysis using a mobile computing device such as a smartphone or tablet computing device or even a laptop computer. These modern devices have excellent image data processing resources and can be used to tap the image data feeds from nearby surveillance cameras and analyze that image data to provide information on the configuration of the system as a whole.

In general, according to one aspect, the invention features a method for determining relationships between fields of views of surveillance cameras. This method comprises a mobile user device receiving image data from the surveillance cameras and the mobile user device analyzing the image data to determine the relationships between the fields of views of the surveillance cameras.

In examples, the mobile user device determines overlap between the fields of views of the surveillance cameras. It can also determine deadzones between the fields of views of the surveillance cameras.

The mobile user device can be used to define a path monitored by the surveillance cameras, and wherein the mobile user device analyzes the image data for determining the relationships between the fields of views of the surveillance cameras comprises correlating motion among the image data during the defining of the path. The device can determined whether the mobile user device is included in the image data from at least one of the surveillance cameras for determining deadzones or motion correlated to determine overlap between the surveillance cameras.

In general, according to another aspect, the invention features a system that determines relationships between fields of views of surveillance cameras. This system comprises a mobile user device that receives image data from the surveillance cameras and analyzes the image data to determine the relationships between the fields of views of the surveillance cameras.

In general, according to still another aspect, the invention features a surveillance camera system, comprising a mobile user device for defining a critical path, surveillance cameras capturing image data along the critical path, and an analytics system of the mobile user device determining overlap of fields of view of the surveillance cameras from the image data and/or determining deadzones between the fields of view of the surveillance cameras from the image data.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 9 is a sequence diagram showing a preferred installer method embodiment of the present invention, where the method enables an installer to determine overlap among fields of view of the surveillance cameras during installation of the cameras, and where the fields of view include an installer carrying the mobile computing user device as the installer/user device moves along a critical path within a monitored corridor of the premises;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
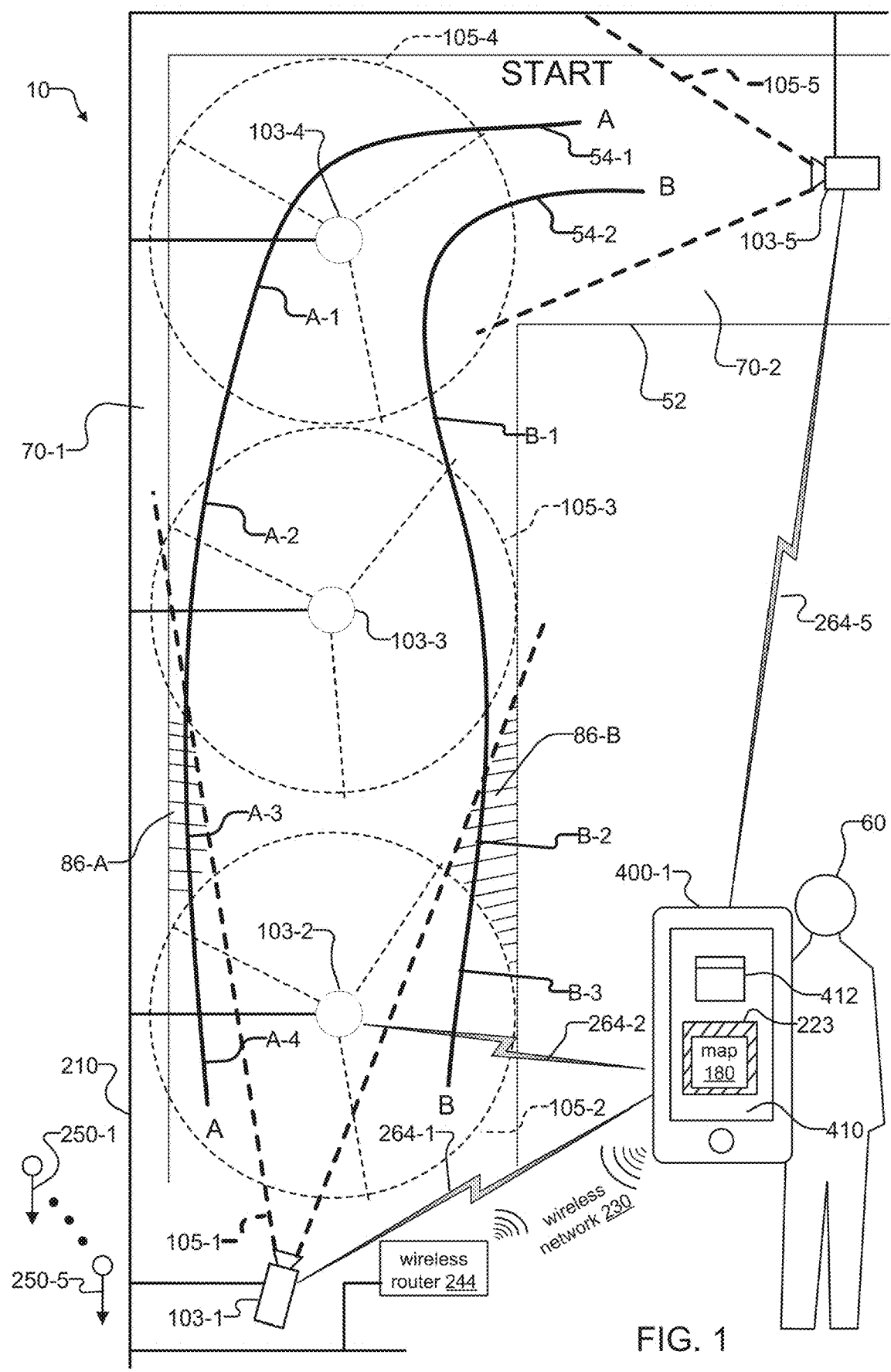
FIG. 1 is a schematic diagram showing mapping of deadzones for a network of surveillance cameras installed at an exemplary premises along with a mobile computing device that accesses image data from the surveillance cameras, where each of the surveillance cameras monitors a scene within the premises, and where the mobile computing device enables definition of a critical path within the premises for determining whether deadzones exist in the scenes monitored by the surveillance cameras.

FIG. 1 shows an exemplary surveillance camera system 10 to which the invention is applicable. Surveillance cameras 103-1 through 103-5 are installed as a network to monitor a corridor 70 within a premises 52, for example. Each of the cameras 103-1 through 103-5 has a field of view 105-1 through 105-5, respectively. The surveillance cameras 103 communicate with each other over a local network 210.

Each of the surveillance cameras 103-1 through 103-5 capture image data 250-1 through 250-5 of scenes within the fields of view 105-1 through 105-5 of the cameras, respectfully. The surveillance cameras 103 transmit their image data 250 over the local network 210. A wireless router 244 provides a wireless network 230 such as WiFi that enables exchange of wireless messages 264 between components. The wireless router 244 also has a local network interface that connects the wireless router 244 to the local network 210.

An installer 60 holds a user mobile computing device 400, also known as a user device, for communicating with the surveillance cameras 103. Examples of user devices 400 include smartphones, tablet computing devices, and laptop computers running operating systems such as Windows, Android, Linux, or IOS, in examples. Each user device 400 includes a display screen or touch screen 410 and one or more applications/processes that execute upon the operating systems of the user devices 400. Relevant processes include a user app 412 and an analytics process for implementing the functionality of an analytics system 223.

The analytics system 223 preferably includes or utilizes a map 180, which is an image representation of the area of the premises 52 (e.g. the corridor 70) under surveillance by the cameras 103. The installer 60 typically loads the map 180 onto the analytics system 223 before or after initial installation of the cameras 103 but usually prior to analyzing the corridor 70 for deadzones 86. The map 180 further preferably includes the locations of each of the cameras 103-1 through 103-5 of the network.

The user devices 400 can exchange wireless messages 264 directly between each surveillance camera 103. Exemplary wireless messages 264-1, 264-2 and 264-5 between user device 400-1 and surveillance cameras 103-1, 103-2, and 103-5 are shown. The surveillance cameras 103 also transmit their image data 250 either directly or indirectly over the wireless network 230 to the user device 400 in the wireless messages 264 via the wireless router 244 or directly via peer-to-peer connections. Even Bluetooth or similar protocol could be used. The user device 400 receives the wireless messages 264, extracts the image data 250 therein, and forwards the image data 250 to its analytics system 223 to determine deadzones 86 between the scenes/fields of view 105 of the cameras 103.

It is important to note that additional or different instantiations of the analytics system 223 can exist in the system 10. In one example, the functionality of the analytics system 223 can be distributed across multiple processes executing on the same user device 400. In another example, the functionality of analytics system 223 is distributed among cooperating software and/or hardware components on user device 400, such as across multiple cores of a Central Processing Unit (CPU) of the user device 400, or among application-specific processors separate from and/or in conjunction with the CPU. In yet another example, the functionality of the analytics system 223 can include external peripherals that connect to the user device 400 via extensible interfaces, such as an analytics system within a Universal Serial Bus (USB) flash drive that connects to a corresponding USB port of the user device 400, or the analytics system could be partially executing on processing executing on the surveillance cameras 103.

Via the wireless messages 264, user device 400-1 sends instructions to configure the cameras 103 and access the image data 250 on the cameras 103. The wireless messages 264 include both control and data wireless messages. In one example, data wireless messages 264 include frames of image data 250 that the surveillance cameras 103 send to the user mobile computing devices 400.

A specific example showing how the cameras 103 might be deployed is illustrated. In the example, dome style cameras 103-2, 103-3 and 103-3 are mounted overhead to monitor a long section 70-1 of the corridor 70. Camera 103-1 is a fixed style camera mounted along a wall of the long section 70-1 such that its field of view 105-1 provides a side view of the same long section 70-1 monitored by the cameras 103-2, 103-3, and 103-4. To monitor a small section 70-2 of the corridor 70 that is at a right angle to the long section 70-1, a fixed style camera 103-5 mounted along a wall of the small section 70-2 is utilized.

Deadzones 86 can exist after installing the surveillance cameras 103. Exemplary deadzones 86-A and 86-B are shown. Deadzones 86-A and 86-B are regions in the long section 70-2 of the corridor 70 that are not included within any of the fields of view 105 of any of the surveillance cameras 103. One way that installers can determine and subsequently eliminate deadzones 86 is based on analysis of image data 250 of individuals 60 as they walk a "critical path" 54 through a monitored scene that is also defined within the map 180.

Two critical paths "A" 54-1 and "B" 54-2 are defined to detect deadzones 86-A and 86-B, respectively. Exemplary positions A-1 through A-4 along path A and positions B-1 through B-3 along path B are shown. A deadzone 86 likely exists when the installer 60 (or the user device 400-1 held by the installer 60) is not included within the field of view 105 of at least one surveillance camera 103, for each position along the path.

Beginning at "START," the installer/user device first walks critical path A and encounters position A-1. When the installer 60 is at A-1, the installer 60 is included within the fields of view 105-4 and 105-1 of cameras 103-4 and 103-1, respectively. As a result, the analytics system 223 can deduce that no deadzone 86 exists near A-1. Similarly, no deadzone exists near A-2, because the installer 60 when at A-2 is included within both the fields of view 105-3 and 105-1 of cameras 103-3 and 103-1, respectively. Also, no deadzone exists near A-4, because the installer 60 when at A-4 is included within the field of view 105-1 of camera 103-1. However, when the installer 60 is at A-3, the installer 60 is not included within the field of view 105 of any surveillance camera 103. As a result, the analytics system 223 can deduce that there is a deadzone 86-A near A-3.

In a similar fashion, the installer/user device then walks critical path B, also beginning at "START." The analytics system 223 can deduce that there are no deadzones 86 near positions B-1 and B-3 along path B, because the installer 60 is included within the field of view 105-1 of camera 103-1 when at B-1, and because the installer 60 is included within the field of view 105-2 of camera 103-2 when at B-3. However, when the installer 60 is at B-2, the installer 60 is not included within the field of view 105 of any surveillance camera 103. As a result, the analytics system 223 can deduce that there is a deadzone 86-B near B-2.

It is also important to note that the analysis of the image data 250 provided by the analytics system 223 for determining deadzones 86 between fields of view 105 of the surveillance cameras 103 either be executed in real time, or at a time after the cameras 103 are installed and operating and even when the image data has been stored, in a forensics fashion. For the real time analysis, the analytics system 223 preferably receives the image data 250 from the cameras 103 just after the cameras 103 capture the image data 250 of the scene. For the forensic analysis of the image data 250, the analytics system 223 can analyze previously recorded image data 250 of the scene stored on a network video recorder 228, or image data 250 stored locally within the cameras 103, in examples.

Figure 2:
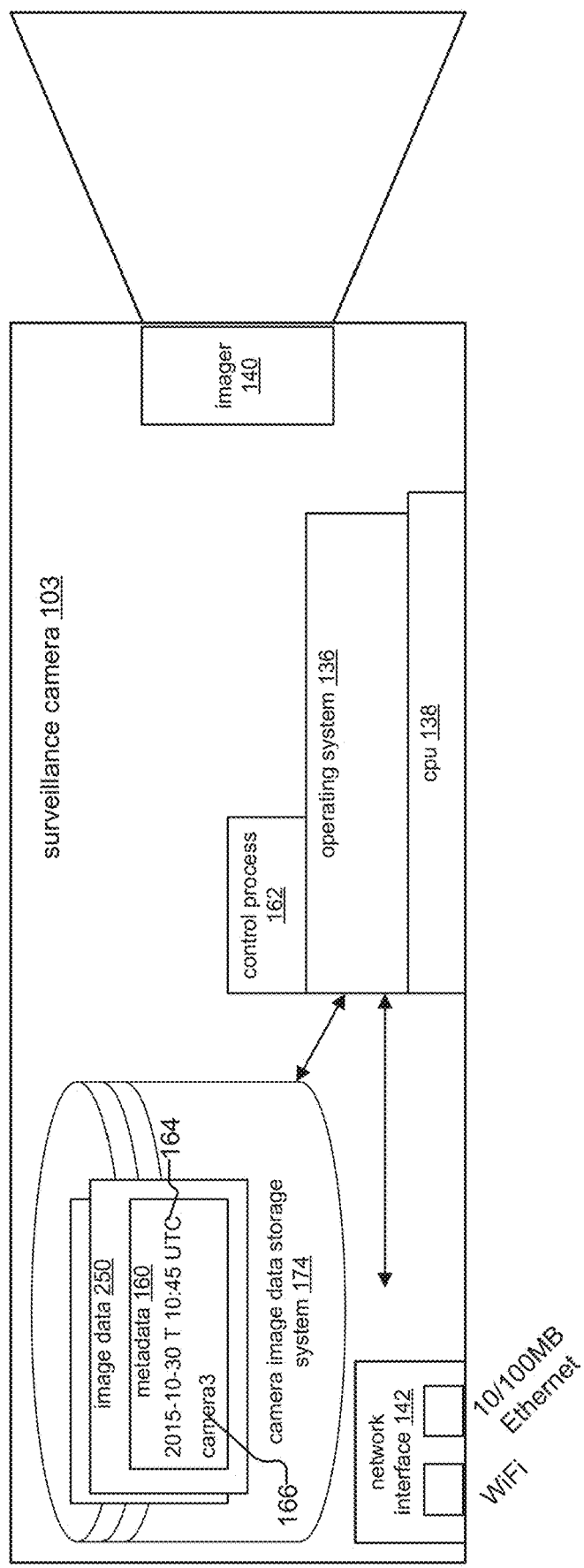
FIG. 2 is a schematic diagram showing some of the components of the surveillance cameras.

FIG. 2 shows some of the components of an exemplary surveillance camera 103.

The camera 103 includes a processing unit (CPU) 138, an imager 140, a camera image data storage system 174 and a network interface 142. An operating system 136 runs on top of the CPU 138. A number of processes or applications are executed by the operating system 136. One of the processes is a control process 162.

The camera 103 saves image data 250 captured by the imager 140 to the camera image data storage system 174. Each camera 103 can support one or more streams of image data 250. The control process 162 receives and sends messages 264 via its network interface 142. Each camera 103 also saves metadata 160 for the image data 250, including a timestamp 164 and camera number 166.

In other examples, the image data is stored off of the camera on other cameras and/or a local image data storage system.

During execution of the "installer method" disclosed embodiment for detecting deadzones 86, after the critical paths 54 are defined by the installer 60 holding the user device 400-1, the user device 400-1 requests information for the analytics system 223 for analysis of potential deadzones 86. This information includes image data collected over a time interval (e.g. for the time period in which the installer 60 traversed the path 54), position information collected by the user device 400 held by the installer 60 during the traversal of the path 54.

Figure 3:
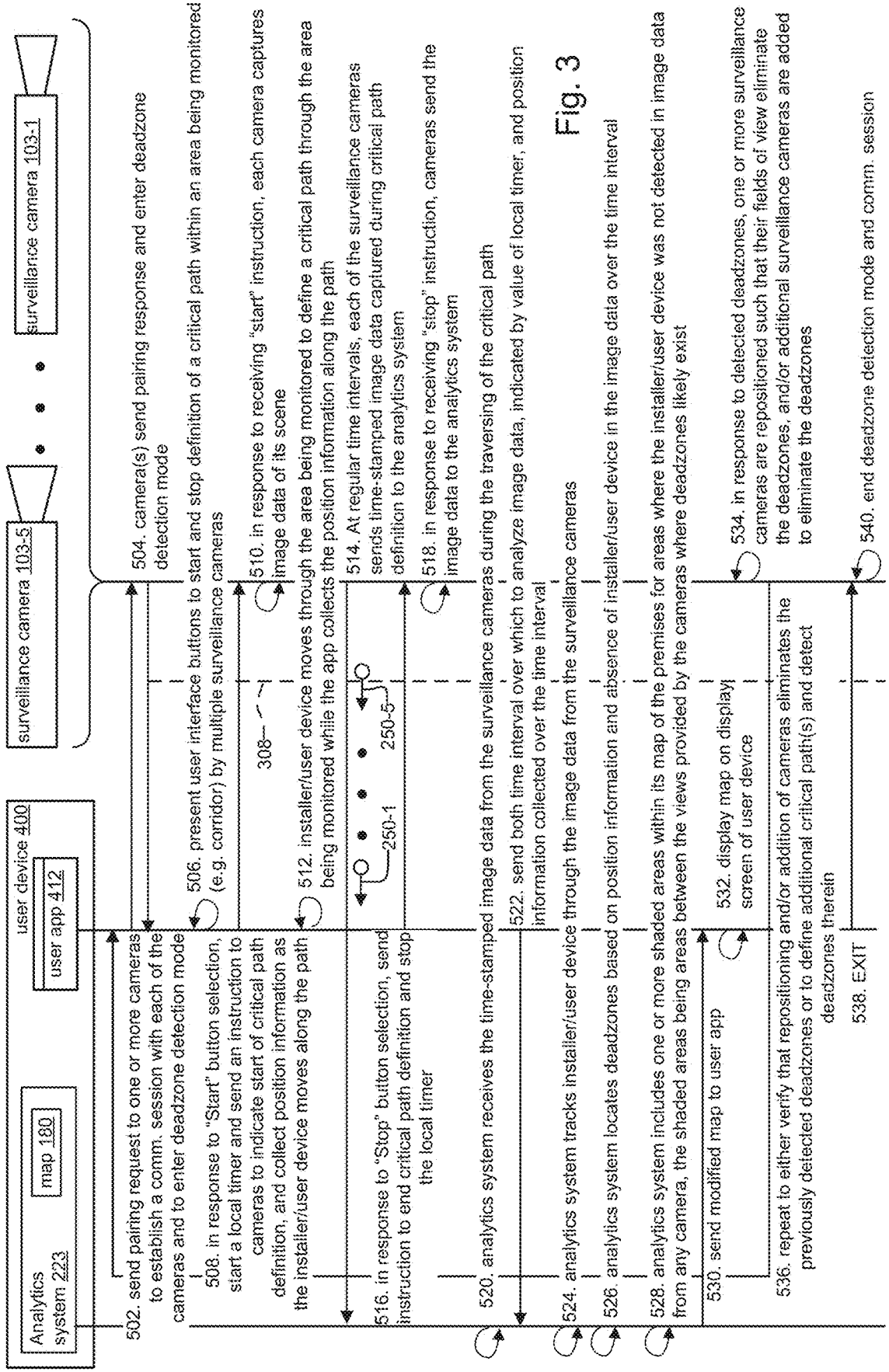
FIG. 3 is a sequence diagram showing the determination of deadzones during installation of the surveillance cameras using the mobile computing device.

FIG. 3 describes the preferred "installer method" that enables an analytics system 223 to determine deadzones 86 during installation of the surveillance cameras 103. The method is described by way of an example critical path 54 traversal by an operator within a monitored area, and provides details of interactions between major components of the surveillance camera system 10 both during and after traversal of the path 54 to determine likely deadzones 86.

In step 502, a user app 412 running on the user device 400 sends a pairing request to one or more cameras 103 to establish a communications session 308 with each of the cameras 103 and for the surveillance cameras 103 to enter a deadzone detection mode. According to step 504, the cameras 103 send a pairing response message and enter deadzone detection mode. As a result of step 504, a communication session 308 is established between each of the cameras 103 currently in deadzone detection mode and the user app 412. In step 506, the user app 412 then presents user interface buttons to start and stop definition of a critical path 54 within an area being monitored (e.g. corridor 70) by multiple surveillance cameras 103.

According to step 508, in response to selection of a "Start" button on the user interface of the user app 412 by the installer 60, the user app 412 starts a local timer and sends an instruction to the cameras 103 to indicate start of critical path definition, and collects position information as the installer/user device moves along the critical path 54. The position information can be obtained by GPS or indoor GPS system or from an inertial system in the user device 400, in examples.

In step 510, in response to receiving the "start" instruction, each camera 103 captures image data 250 of its scene. Then, in step 512, the installer/user device moves through the area being monitored to define a critical path 54 through the area being monitored while the user app 412 collects position information along the path 54.

In step 514, at regular time intervals, each of the surveillance cameras 103 sends time-stamped image data 250 captured during the definition of the critical path 54 to the analytics system 223 within the user device 400.

According to step 516, in response to selection of a "stop" button on the user interface of the user app 412 by the installer 60, the user app 412 stops the local timer and sends an instruction to the cameras 103 to end definition of the critical path 54. In response to receiving the "stop" instruction, the cameras 103 send their remaining image data 250 to the analytics system 223, in step 518.

According to step 520, the analytics system 223 receives the time stamped image data 250 from the surveillance cameras 103 during definition of the critical path 54. In step 522, the user app 412 sends to the analytics system 223 both the time interval over which to analyze the image data 250, given by the value of the local timer, and the position information that the user app 412 collected over the time interval. The analytics system 223 then tracks the installer/user device through the image data 250 from the surveillance cameras 103, in step 524.

In step 526, the analytics system 223 locates deadzones 86 based on the position information and absence of the installer/user device within the image data 250 over the time interval. Then, in step 528, the analytics system 223 includes one or more shaded areas within its map 180 of the premises 52 for areas where the installer/user device was not detected in image data 250 of any surveillance camera 103. The shaded areas are areas between the views provided by the cameras 103 where deadzones 86 likely exist. The analytics system 223 sends the modified map 180 to the user app 412 in step 530.

In response, in step 532, the user app 412 displays the map 180 on the display screen 410 of the user device 400. According to step 534, in response to detected deadzones 86, one or more surveillance cameras 103 are repositioned such that their fields of view 105 eliminate the deadzones 86. In addition, the installer 60 can install additional surveillance cameras 103 to eliminate the deadzones 86. In step 536, the installer 60 repeats this process to verify that the repositioning and/or addition of surveillance cameras 103 eliminates the previously detected deadzones 86 or to define additional critical path(s) 54 and detect deadzones 86 therein.

Finally, in step 538, the installer 60 exits the user app 412, and each of the cameras 103 exit deadzone detection mode and end their communication sessions 308 with the user app 412 in step 540.

Figure 4:
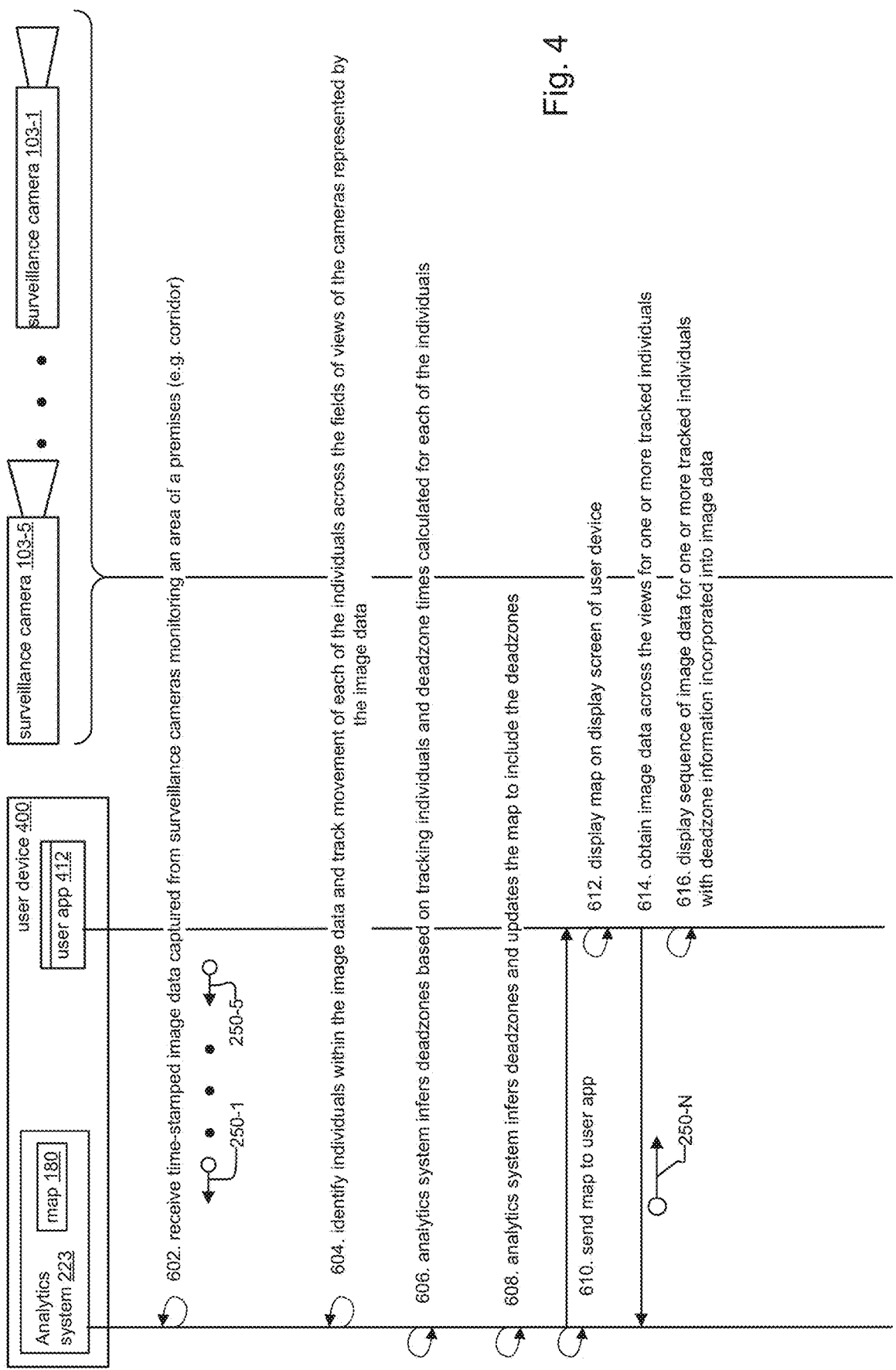
FIG. 4 is a sequence diagram showing a method for inferential determination of deadzones, where the deadzones are inferred from image data captured by the surveillance cameras using the mobile computing device.

FIG. 4 describes another method for detecting deadzones 86, where the deadzones 86 are inferred from image data 250 taken of the scene.

In step 602, the analytics system 223 receives time stamped image data 250 captured from surveillance cameras 103 monitoring an area of a premises 52, such as the corridor 70 of FIG. 1.

In step 604, the analytics system 223 identifies individuals within the image data 250 and tracks movement of each of the individuals across the fields of views 105 of the cameras 103 represented by the image data 250. In step 606, the analytics system 223 infers deadzones 86 based on tracking individuals and deadzone times 87 calculated for each of the individuals.

A deadzone time 87 is the elapsed time from when a specific individual is last detected in image data 250 of any camera 103 at one point in time, and the next time that individual is detected in image data 250 of another camera 103. When fields of view 105 are optimally positioned to eliminate deadzones 86, for example, individuals 60 passing through a monitored area at a reasonably continuous rate will be represented by the analytics system 223 as "blobs" within the image data 250, where the blobs appear to seamlessly exit one scene and enter another with minimal time delay (e.g. deadzone time 87) that is relatively consistent across all scenes of the cameras 103.

However, when there are deadzones 86, an individual could last be seen in image data 250 exiting a scene in the field of view 150 of one camera 103, but then "disappear" from view for a period of time. The next time the individual appears in the image data 250, the individual is exiting a scene in the field of view 150 of a different camera 103. As a result, the deadzone time 87 for this portion of the tracked individual's motion would be greater than that expected, from which location of a deadzone 86 may be inferred.

In step 608, the analytics system 223 infers deadzones 86 and updates the map 180 to include the deadzones 86. The analytics system 223 then sends the map 180 to the user device 400 in step 610. The user app 412 displays the map 180 on the display screen 410 of the user device 400. According to step 614, the user device 400 obtains image data 250 from the analytics system 223 across the views for one or more tracked individuals. In response, in step 616, the user app 412 displays a sequence of image data 250 for one or more tracked individuals with deadzone information incorporated into the image data 250.

Figure 5:
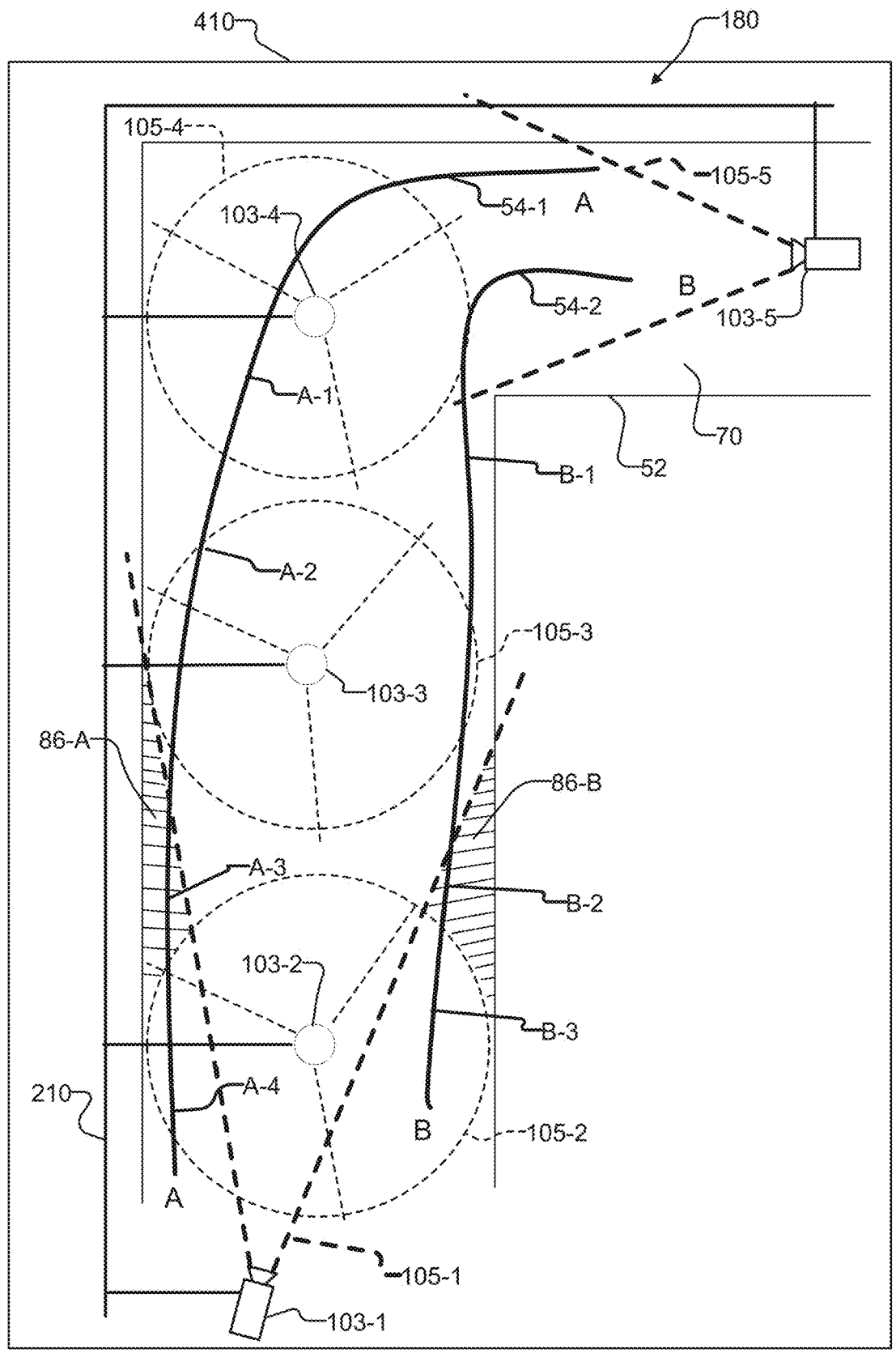
FIG. 5 shows a floor plan map of an area within a premises monitored by surveillance cameras, where the methods of FIG. 3 and FIG. 4 determine deadzones in the area monitored by the surveillance cameras, include the deadzones as shaded areas within the map, and present the map for display on a user device.

FIG. 5 shows an image representation of a map 180 of a monitored area rendered on a display screen 410 of a user device 400. The map 180 is for monitored area (e.g. corridor 70) of the premises 52 in FIG. 1. The map 180 has been modified by the deadzone detection methods of FIG. 3 and FIG. 4. The analytics systems 223 of these methods were able to determine deadzones 86-A and 86-B in corridor 70, and highlighted the deadzones 86 graphically within the map 180 as shaded areas before sending the map 180 for display on the user device 400. This enables the installer 60 or operator to have an "at a glance" visual indication of deadzones 86 determined from the methods of FIG. 3 and FIG. 4.

Figure 6:
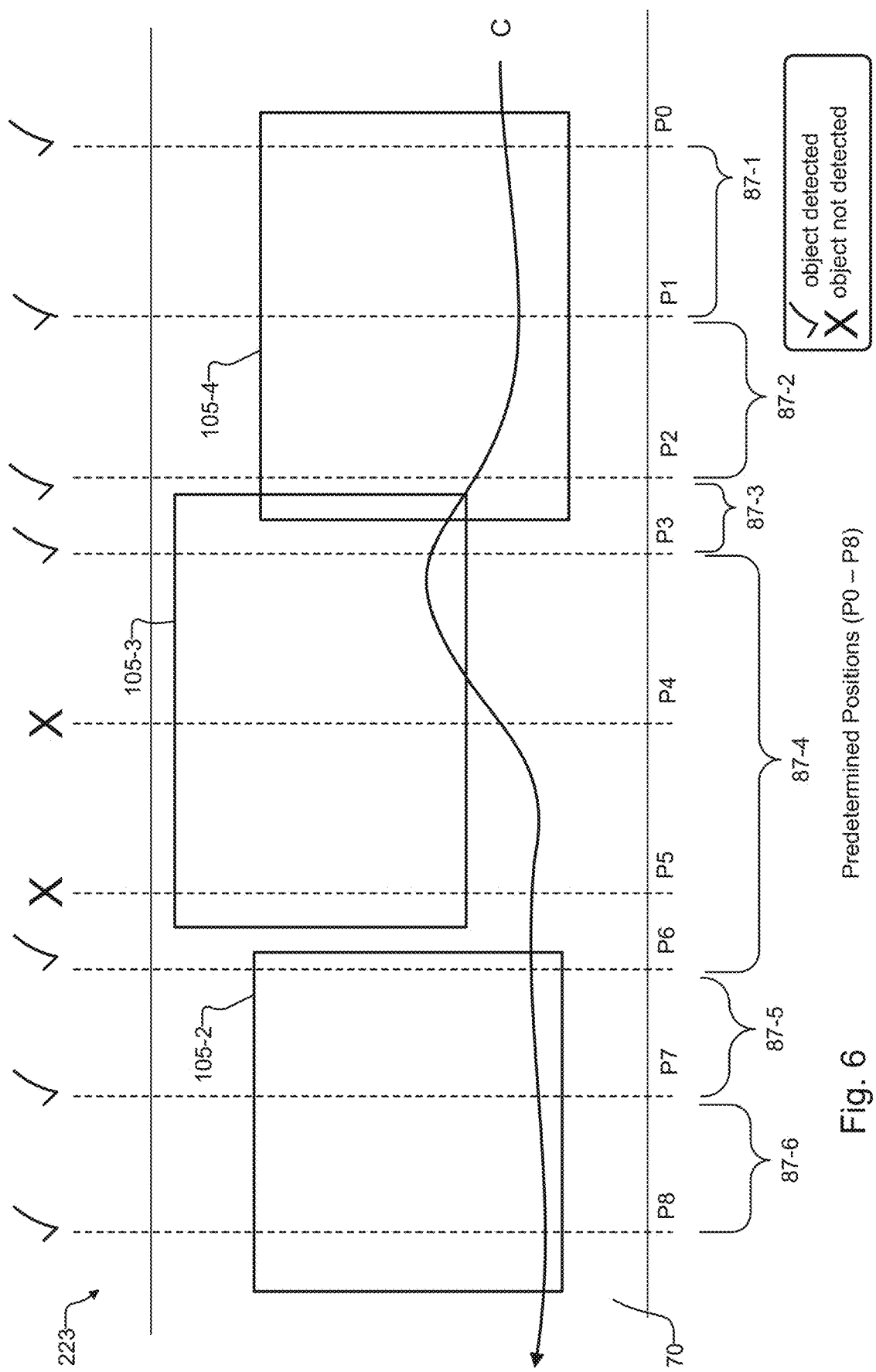
FIG. 6 is a schematic diagram showing how an analytics system according to the methods of FIG. 3 and FIG. 4 tracks objects across the fields of view of the surveillance cameras to determine deadzones among the views from an analysis viewpoint.

FIG. 6 shows a schematic representation of exemplary analysis method utilized by an analytics system 223 to determine deadzones 86 in a monitored area (here, corridor 70 of a premises 52). The analytics system 223 receives position information for a monitored area, image data 250 of the monitored area captured by surveillance cameras 103, and a time interval over which to track movement of one or more objects across the image data 250 relative to the position information. For the embodiment of FIG. 3, the object tracked is the installer/user phone moving through the scene, where reference "C" identifies the critical path 54 traversed by the installer/user device through the scene. For the embodiment of FIG. 4, the object tracked is a specific individual that the analytics system 223 identifies and tracks through the scene, and reference "C" identifies the path that the specific individual traverses through the scene.

In the illustrated example, an installer 60 adjusts fields of view 105-2 through 105-5 of cameras 103-2 through 103-5 to monitor activities in a monitored area (e.g. corridor 70). The analysis method tracks movement of the object along path "C" through image data 250 captured by cameras 103-2 through 103-5 over the time interval, and calculates deadzone times 87 at positions P0 through P8. The positions are typically spaced apart at a similar distance and also are selected to include at least the leading and trailing edges of each of the fields of view 105 of the cameras 103.

The analytics system 223 is configured by the installer 60 to detect the object in the fields of view 105 of the cameras 103 at positions P0-P8. The analytics system detects the object at positions P0 through P3, but does not detect the object at positions P4 and P5. Finally, the analytics system 223 detects the object at positions P6 through P8. As a result, in one example, the analytics system can infer that there may be a deadzone 86 in the corridor 70 located near positions P4 and P5 of the premises 52. The analytics system 223 then updates its map 180 to include the determined deadzones 86.

Now viewing the same example from the aspect of deadzone times 87, the analytics system 223 determines reasonably consistent deadzone times 87-1 through 87-3 as the object traverses critical path "C" and crosses positions P0 through P3. Adjacent deadzone times 87 also include a common position as an endpoint, and each position is included as an endpoint in at least one deadzone time 87 calculation. For example, deadzone time 87-1 is associated with the time taken for the object to traverse along "C" from position P0 to P1, deadzone time 87-2 for position P1 to P2, and deadzone time 87-3 for position P2 to P3. As a result, the analytics system 223 can infer that a deadzone 86 likely does not exist between the positions indicated by deadzone times 87-1 through 87-3 (i.e. positions P0 through P3).

After the object crosses position P3, however, the analytics system 223 determines a much larger than expected deadzone time 87-4 occurring at positions near where the field of view 105-3 of camera 103-3 is positioned. In the example, the larger deadzone time 87-4 is associated with the time taken for the object to traverse along "C" and crossing positions P3 to P6. Positions P4 and P5 are not included as endpoints in any deadzone times 87. As a result, the analytics system 223 can infer that a deadzone 86 likely exists somewhere between the positions indicated by the start and end times of deadzone time 87-4.

In a similar vein, after the object crosses position P6, the analytics system 223 determines deadzones 87-5 and 87-6. Deadzone time 87-5 is associated with the time taken for the object to traverse along "C" from position P6 to P7, and deadzone time 87-6 for position P7 to P8. Because adjacent deadzone times 87-5 and 87-6 are consistent with that of deadzone times 87-1 through 87-3, include common position P7 an endpoint, and each position from P6 through P8 are included as an endpoint in at least one deadzone time 87 calculation, the analytics system can infer that a deadzone 86 likely does not exist between the positions indicated by deadzone times 87-5 and 87-6 (i.e. positions P6 through P8).

Figure 7:
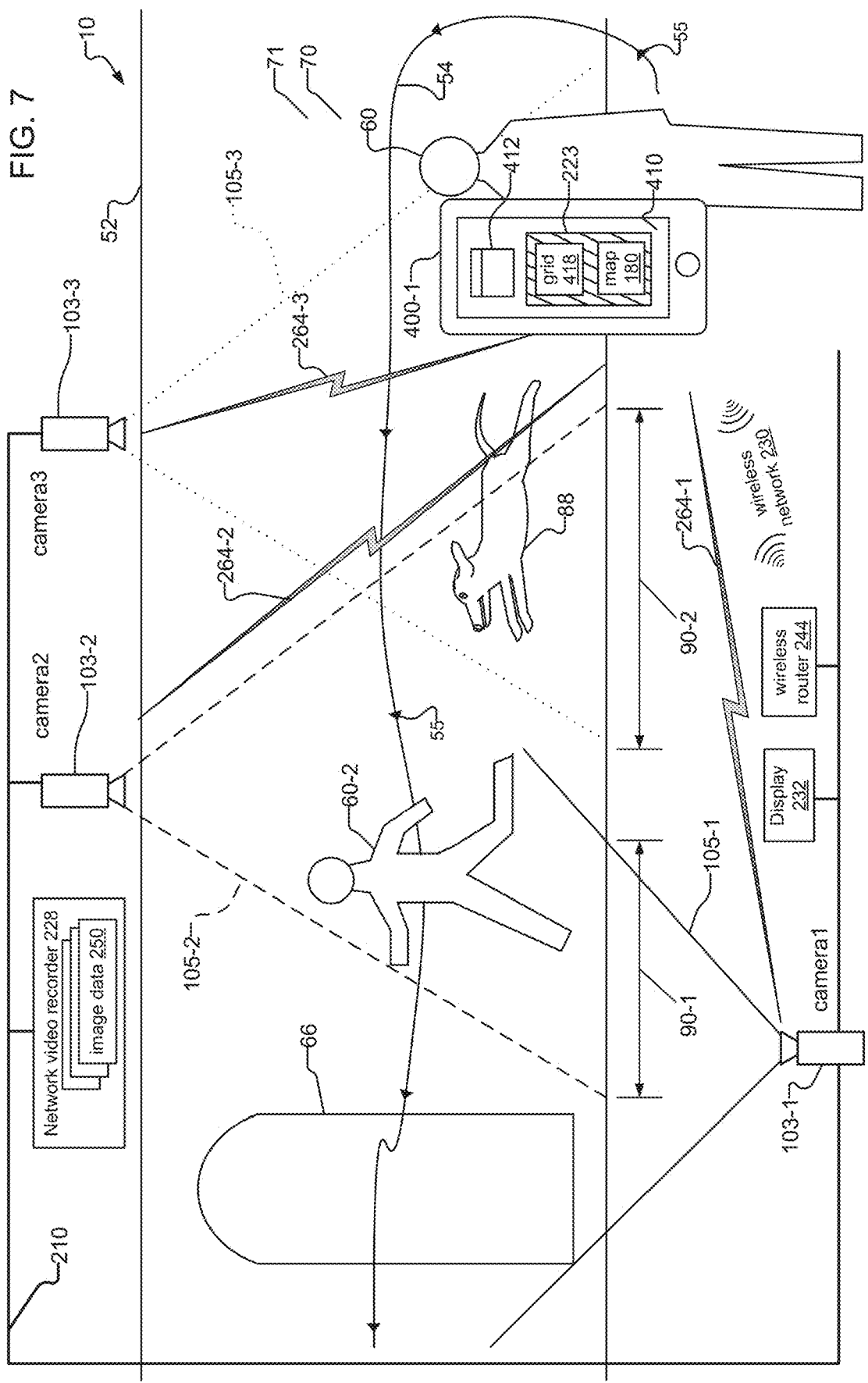
FIG. 7 is a schematic diagram showing a network of surveillance cameras installed at another exemplary premises, where each of the surveillance cameras is positioned to monitor an area at the premises for illustrating additional embodiments of the invention for determining whether overlap exists in the scenes monitored by the surveillance cameras.

FIG. 7 shows another exemplary surveillance camera system 10 to which the invention is applicable.

Surveillance cameras 103-1 through 103-3, labeled camera1 through camera3, have fields of view 105-1 through 105-3, respectively. The cameras 103 are installed to monitor a corridor 70 within a premises 52, in one example. In the illustrated example, a doorway 66 is located at the end of the corridor 70. In another example, the cameras 103 are installed around a premises to monitor an alley 71 adjacent to the premises 52.

The surveillance cameras 103 communicate with each other over a local network 210. The system 10 might also include a network video recorder 228 that stores image data 250 captured by the surveillance cameras 103.

Each of the surveillance cameras 103-1 through 103-3 captures image data 250 of a scene within their respective fields of view 105-1 through 105-3 of the cameras. The surveillance cameras 103 transmit their image data 250 over the local network 210.

A wireless router 244 provides a wireless network 230 such as WiFi or a cellular wide area network that enables exchange of wireless messages 264 between components. The wireless router 244 also has a local network interface that connects the wireless router 244 to the local network 210.

In one implementation, as in the system 10 of FIG. 1, an installer 60-1 holds a user device 400 for communicating with the surveillance cameras 103. Each user device 400 includes a display screen or touch screen 410 and one or more applications/processes that execute upon the operating systems of the user devices 400. Relevant processes include a user app 412 and an analytics process for implementing the functionality of an analytics system 223.

The analytics system 223 includes a map 180 and creates an intelligent display grid 418 that includes image data 250 from at least two surveillance cameras 103. The map 180 is an image representation of the area of the premises 52 (e.g. the corridor 70 and/or alley 71) under surveillance by the cameras 103. The installer 60 typically loads the map 180 onto the analytics system 223 after initial installation of the cameras 103 but prior to analyzing the corridor 70 and/or alley 71 for instances of overlap 90. The map 180 further preferably includes the locations of each of the cameras 103-1 through 103-3 of the network. On the other hand, the analytics system operates in a forensics fashion. It acquires stored image data from the cameras over a common time period and analyzes that image data to determine overlap.

The user device 400 can exchange wireless messages 264 directly between each surveillance camera 103. Exemplary wireless messages 264-1, 264-2 and 264-3 between user device 400 and surveillance cameras 103-1, 103-2, and 103-3 are shown. The surveillance cameras 103 transmit their image data 250 over the wireless network 230 to the user device 400 in wireless messages 264 via the wireless router 244. The user device 400 receives the wireless messages 264, extracts the image data 250 therein, and forwards the image data 250 to the analytics system 223 to determine instances of overlap 90 between the scenes/fields of view 105 of the cameras 103.

It is important to note that additional or different instantiations of the analytics system 223 can exist in the system 10. As in the description of FIG. 1 herein above, where the analytics system 223 of the user device 400 that determines deadzones 86 can have different implementations, the integrated analytics system 223 for determination of overlap among scenes/fields of view 105 of the cameras 103 can have similarly different implementations.

Via the wireless messages 264, user device 400 sends instructions to configure the cameras 103 and access the image data 250 on the cameras 103. The wireless messages 264 include both control and data wireless messages. In one example, data wireless messages 264 include frames of image data 250 that the surveillance cameras 103 send to the user mobile computing devices 400.

Specific examples showing how the cameras 103 might be deployed are illustrated. In one example, dome style cameras camera2 and camera3 are mounted overhead within a premises 52 to monitor corridor 70. Camera1 is a PTZ style camera mounted along a wall of corridor 70 such that the field of view 105-1 of camera1 provides a side view of the corridor 70. In another example, similar dome style cameras camera2 and camera3 are mounted overhead outside the premises 52 to monitor alley 71. In this example, camera1 might also be a PTZ style camera mounted along a wall of an adjacent building such that the field of view 105-1 of camera1 provides a side view of the alley 71.

An installer 60-1 might initially position camera1 and camera2 such that their fields of view 105-1 and 105-2 include a common portion of the scene, indicated by overlap 90-1. In a similar fashion, the installer 60-1 positions camera2 and camera3 to include a different portion of the scene in common between the fields of view 105-2 and 105-3 of camera2 and camera3, indicated by overlap 90-2. However, the initial positioning of the cameras 103 to achieve the desired overlap 90-1/90-2 or no overlap is based on an educated guess and requires verification. To determine that the desired amount of overlap 90-1/90-2 is achieved, in embodiments, the installer 60-1 utilizes the user device 400 in conjunction with the cameras 103 and the analytics system 223.

In a preferred embodiment, with respect to the corridor 70 monitored area example, the system 10 enables determination of overlap 90-1/90-2 during the installation of the cameras 103 in response to the installer 60-1 walking a critical path 54 through the monitored scene (e.g. corridor 70) while carrying the user device 400. The cameras 103 capture the installer/user device in the image data 250 of each of the cameras 103 during the traversal of the critical path 54, and send the image data 250 to the analytics system 223 of the user device 400 to determine the overlap 90-1/90-2 based on correlating detected motion of the installer/user device among overlapping frames of image data 250.

In another embodiment, with respect to the alley 71 monitored area example, the analytics system 223 determines overlap 90-1/90-2 within the scene by first determining motion of objects in image data 250 of the scene. Unlike the previous embodiment, where the motion is associated with a known and predetermined object moving within the scene in a specific manner (e.g. the installer/user device moving through the scene along the critical path 54), the objects and their expected manner of movement are not predetermined. In the example, objects such as a dog 88 and individual 60-2 are moving through the alley 71. Then, the analytics system 223 correlates the detected motion among the image data 250 from the surveillance cameras 103, determines that the correlated detected motion occurs at substantially the same time in the image data 250 from two or more different surveillance cameras 103, and infers that the motion is related and thus that the cameras have overlapping fields of view and the degree of that overlap.

It is also important to note that the analysis of the image data 250 provided by the analytics system 223 for determining overlap 90 between fields of view 105 of surveillance cameras 103 can either be executed in real time, at a time after the cameras 103 are installed, or in a forensics fashion. For the real time analysis, the analytics system 223 preferably receives the image data 250 from the cameras 103 just after the cameras 103 capture the image data 250 of the scene. For the forensic analysis of the image data 250, the analytics system 223 can analyze previously recorded image data 250 of the scene stored on a network video recorder 228, or image data 250 stored locally within the cameras 103, in examples.

Figure 8A:
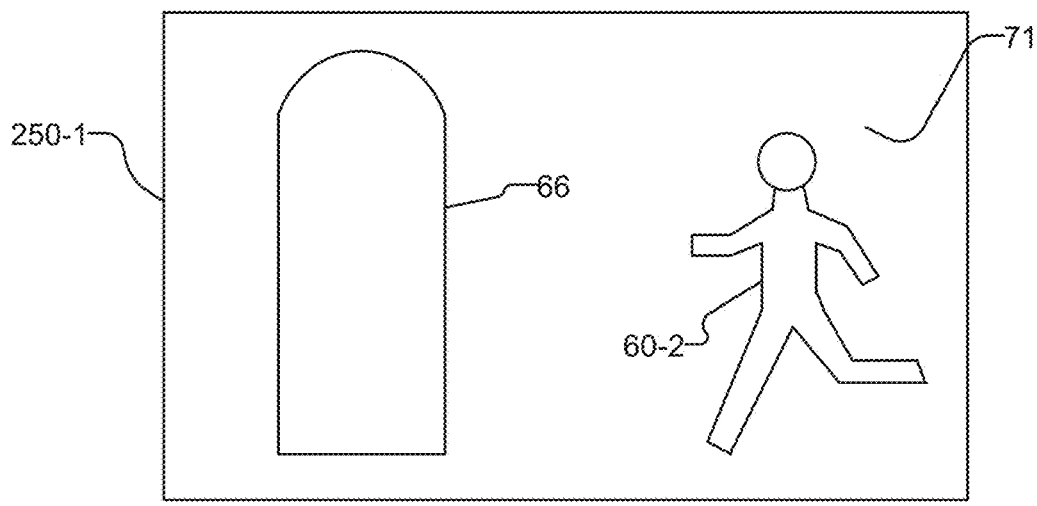
FIGS. 8A-8C are exemplary frames of image data representative of the fields of view of each of the surveillance cameras labeled camera1, camera2, and camera3 in FIG. 7, respectively, and where the image data is associated with objects moving in a monitored alley adjacent to a premises.
Figure 8B:
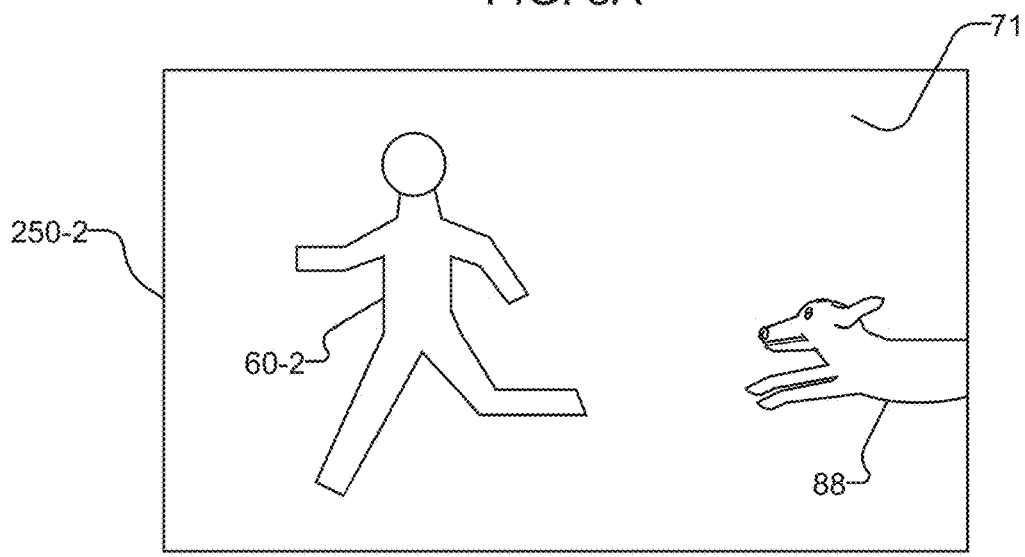
Figure 8C:
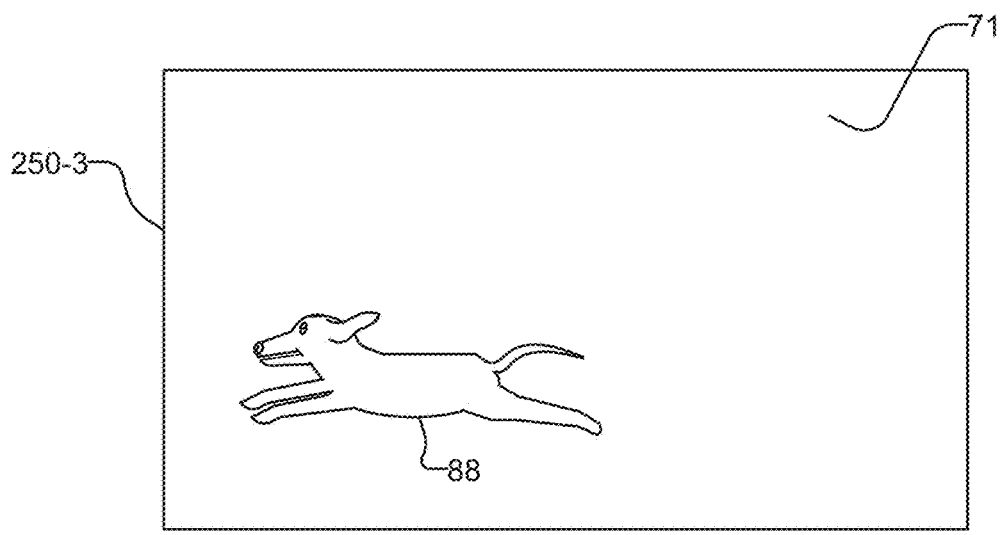

FIG. 8A-8C show exemplary frames of image data 250-1 through 250-3 from camera1, camera2, and camera3, respectively. With respect to FIG. 1, the objects included within the image data 250 are associated with the alley 71 monitored area and are shown to illustrate overlap among image data 250/fields of view 105 of the cameras 103.

In FIG. 8A, a frame of image data 250-1 from camera1 includes a scene of the alley 71 including doorway 66 and individual 60-2. In FIG. 8B, a frame of image data 250-2 from camera2 includes a different scene of the same alley 71, where the scene includes individual 60-2 and a portion of dog 88. Finally, In FIG. 8C, a frame of image data 250-3 from camera2 includes yet another scene of the same alley 71, where the scene includes the entirety of the dog 88. With respect to FIG. 8A and FIG. 8B, because at least a portion of the same object (here, the entirety of individual 60-2) exists in at least two fields of view 105-1/105-2, the image data 250-1/250-2 is said to overlap. With respect to FIG. 8A and FIG. 8B, because at least a portion of the same object (here, the front half of dog 88) exists in at least two fields of view 105-2/105-3, the image data 250-2/250-3 is said to overlap.

FIG. 9 describes a preferred "installer method" embodiment of the system 10 for determining overlap 90 among the fields of view of the surveillance cameras 103. The method is described by way of an example critical path 54 traversal by an installer carrying a user device 400, where the installer/user device moves through a monitored area (e.g. the corridor 70 of FIG. 7) along the critical path 54. The method also provides details of interactions between major components of the system 10 both during and after this process. Preferably, the user device 400 analyzes image data 250 from the cameras 103 to determine overlap 90 between the fields of view 105 of the cameras 103.

In step 702, a user app 412 running on the user device 400 sends a pairing request to one or more cameras 103 to establish a communications session 308 with each of the cameras 103 and for the surveillance cameras 103 to enter an overlap detection mode. According to step 704, the cameras 103 send a pairing response message and enter overlap detection mode. As a result of step 704, a communication session 308 is established between the each of the cameras 103 currently in overlap detection mode and the user app 412, in one example.

In step 706, the user app 412 then presents user interface buttons to start and stop definition of a critical path 54 within an area being monitored (e.g. corridor 70) by multiple surveillance cameras 103.

According to step 708, in response to selection of a "Start" button on the user interface of the user app 412 by the installer 60, the user app 412 starts a local timer and sends an instruction to the cameras 103 to indicate start of the critical path definition. In step 710, the installer/user device moves through the area being monitored to define a critical path 54 through the area being monitored.

In step 714, in response to the receiving the "start" button instruction, at regular time intervals, each of the surveillance cameras 103 sends time-stamped image data 250 captured during the definition of the critical path 54 to the analytics system 223. According to step 716, in response to selection of a "Stop" button on the user interface of the user app 412 by the installer 60, the user app 412 stops the local timer and sends an instruction to the cameras 103 to end definition of the critical path 54. In response to receiving the "stop" instruction, the cameras 103 stop sending their image data 250 to the analytics system 223, in step 718.

According to step 720, the analytics system 223 receives the time stamped image data 250 from the surveillance cameras 103 during definition of the critical path 54. In step 722, the user app 412 sends the time interval over which to analyze the image data 250, indicated by the value of the local timer. The analytics system 223 then tracks the installer/user device through the image data 250 from the surveillance cameras 103, in step 724.

In step 726, the analytics system 223 determines overlap 90 among fields of view 105 of each the cameras 103 by correlating the motion detection events, and determining from the correlated detected motion whether the installer/user device is included within the fields of view 105 of at least two or more different fields of view 105 of the cameras 103 at substantially the same time. Then, in step 728, the analytics system 223 includes image data 250 associated with the determined overlap 90 (e.g. overlapping fields of view 105 of the cameras 103) within an intelligent display grid 418. The image data 250 displayed within the display grid 418 is from at least two surveillance cameras 103 and has at least one portion of an object within a scene monitored by the surveillance cameras included within the image data 250.

According to step 730, the user app 412 displays the intelligent display grid 418 on the display screen 410 of the user device 400, and the installer 60-1 uses the displayed image data 250 within the intelligent display grid 418 concerning overlap 90 between fields of view 105 for each of the surveillance cameras 103 to determine whether the cameras 103 require repositioning to achieve the desired amount of overlap 90.

In step 732, the installer 60-1 optionally repeats this process to either verify that repositioning of the cameras 103 and/or changing settings of the cameras 103 (e.g. lens, zoom) achieves the desired overlap 90 or to define additional critical path(s) 54 and detect overlap 90 therein. Changing the lenses of the cameras 103 can cause a corresponding change in the fields of view 105 of the cameras 103 for achieving the desired overlap 90. This change is required, in one example, when the lenses are of a fixed focus type, which are designed to work for a single, specific working distance. Replacing a fixed lens with a varifocal lens, in one example, enables the installer 60-1 to subsequently adjust the focal length, angle of view, and level of zoom of the cameras 103, thereby enabling adjustment of overlap 90 among fields of view 105 of two or more surveillance cameras 103. Additionally, changing a zoom setting of the cameras 103 can cause a corresponding change in the fields of view 105 of the cameras 103 in accordance with the installer's overlap 90 objectives. This is a typical course of action for adjusting overlap 90 when the cameras 103 are PTZ type cameras, in one example.

In step 734, the installer 60-1 selects an option within the user app 412 to exit overlap detection mode, and the user app 412 sends an associated message 264 to the cameras 103 in response. Finally, in step 736, the cameras 103 receive the exit message 264, and end overlap detection mode and terminate the communications session 308 in response.

In other examples, this analysis might alternatively be performed on stored image data, in a forensic fashion.

Figure 10:
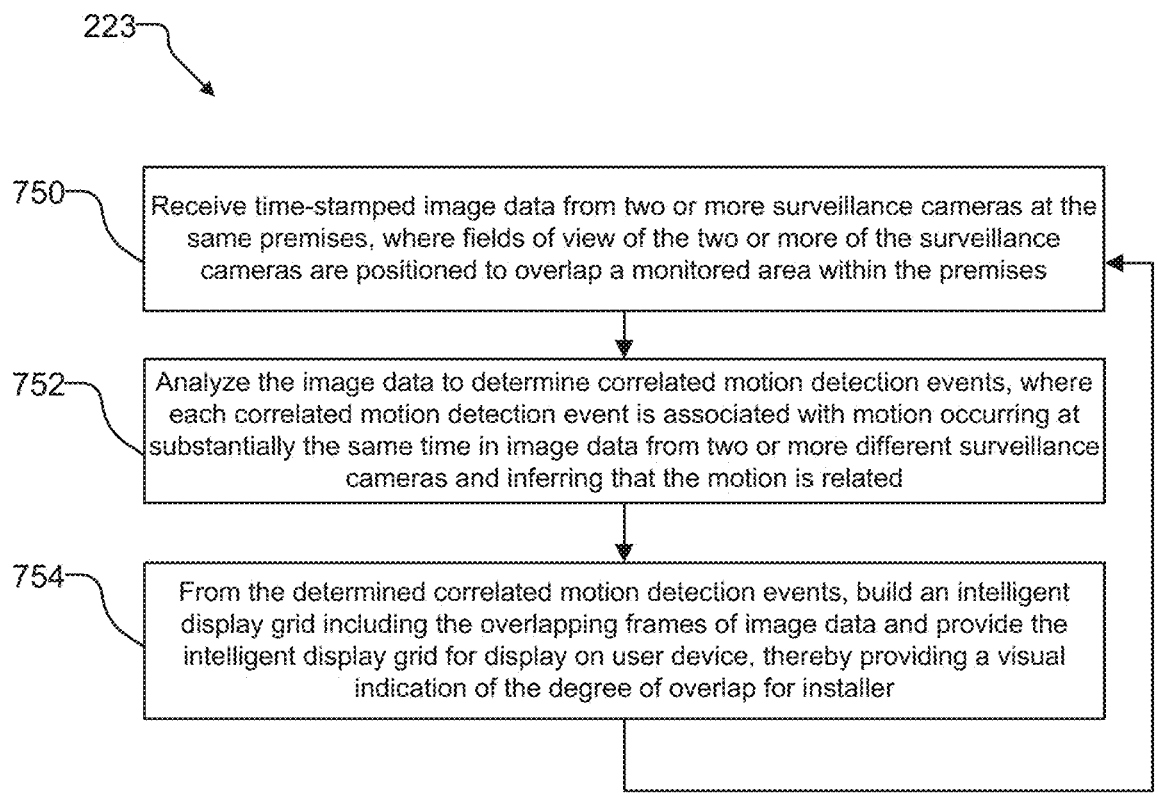
FIG. 10 is a flow chart showing a method for another embodiment of the invention, where an analytics system of the mobile computing device infers overlap from image data captured by the surveillance cameras.

FIG. 10 describes a method for another embodiment, where the overlap 90 is inferred from image data 250 taken of the scene and sent by the analytics system 223.

In step 750, the analytics system 223 receives time-stamped image data 250 from two or more surveillance cameras 103 at the same premises 52, where fields of view 105 of the two or more of the surveillance cameras 103 are positioned to overlap a monitored area within the premises 52.

In step 752, the analytics system 223 analyzes the image data 250 to determine correlated motion detection events, where each correlated motion detection event is associated with motion occurring at substantially the same time in image data 250 from two or more different surveillance cameras 103 and inferring that the motion is related.

Then, in step 754, from the determined correlated motion detection events, the analytics system 223 builds an intelligent display grid 418 including the overlapping frames of image data 250 and provides the intelligent display grid 418 for display on the user device 400, thereby providing a visual indication of the degree of overlap 90 for the installer or operator 60-1. Upon conclusion of step 754, the method transitions back to step 750 to receive the next frames of time-stamped image data 250 from the surveillance cameras 103.

Figure 11:
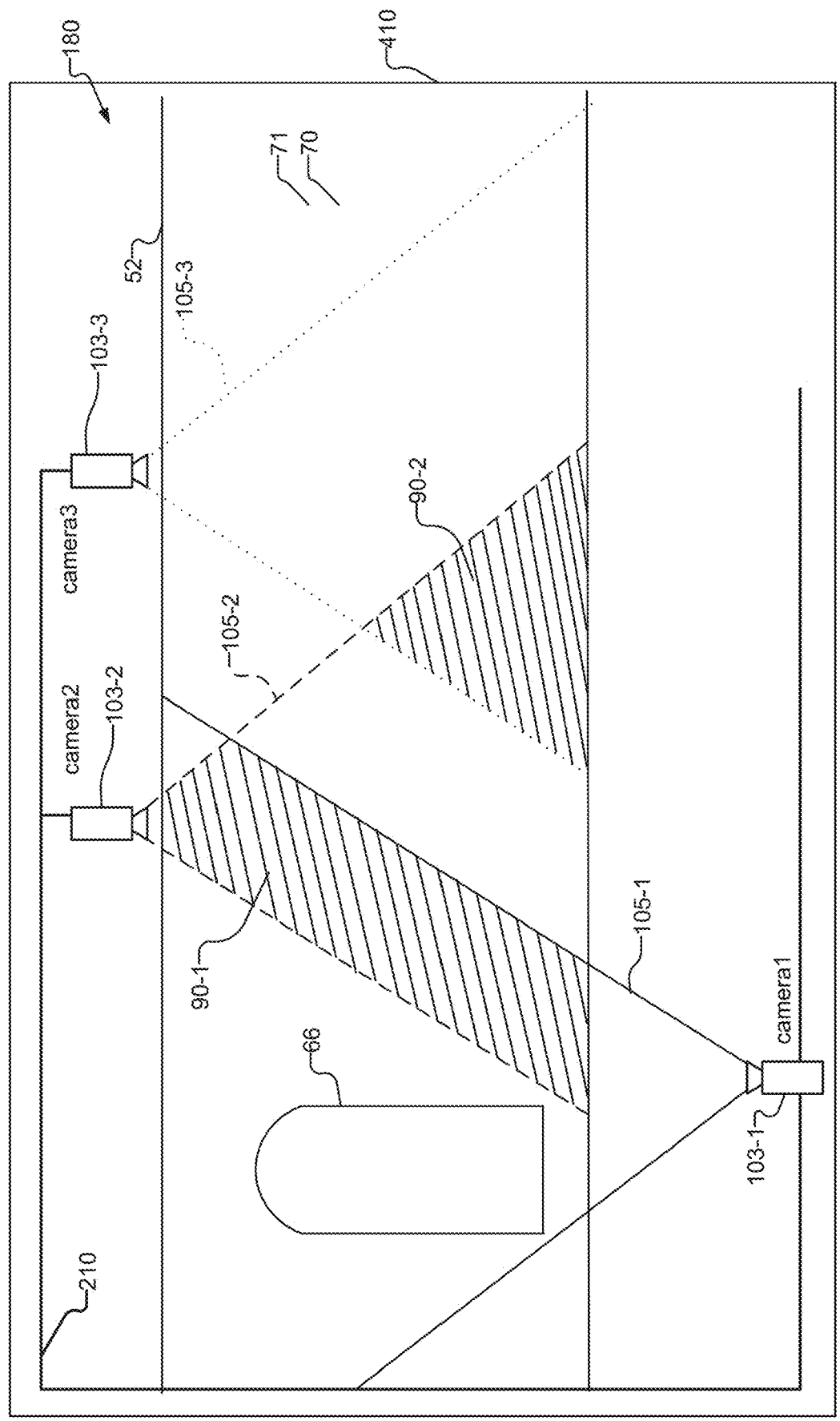
FIG. 11 shows another floor plan map of an area within a premises monitored by surveillance cameras, where the methods of FIG. 9 and FIG. 10 determine overlap in the area monitored by the surveillance cameras, include the overlap as shaded areas within the map, and present the map for display on the mobile computing device.

FIG. 11 shows an image representation of a map 180 of a monitored area rendered on a display screen 410 of a user device 400. The map 180 is for monitored area (e.g. corridor 70 and/or alley 71) of the premises 52 in FIG. 7. The map 180 has been modified by the overlap detection methods of FIG. 9 and FIG. 10. The analytics systems 223 of these methods were able to determine overlap regions 90-1 and 90-2, and highlighted the overlap 90 graphically within the map 180 as shaded areas before providing the map 180 for display on the user device 400. This enables the installer 60 or operator to have an "at a glance" visual indication of overlap 90 among the fields of view 105 of two or more surveillance cameras 103.

Figure 12:
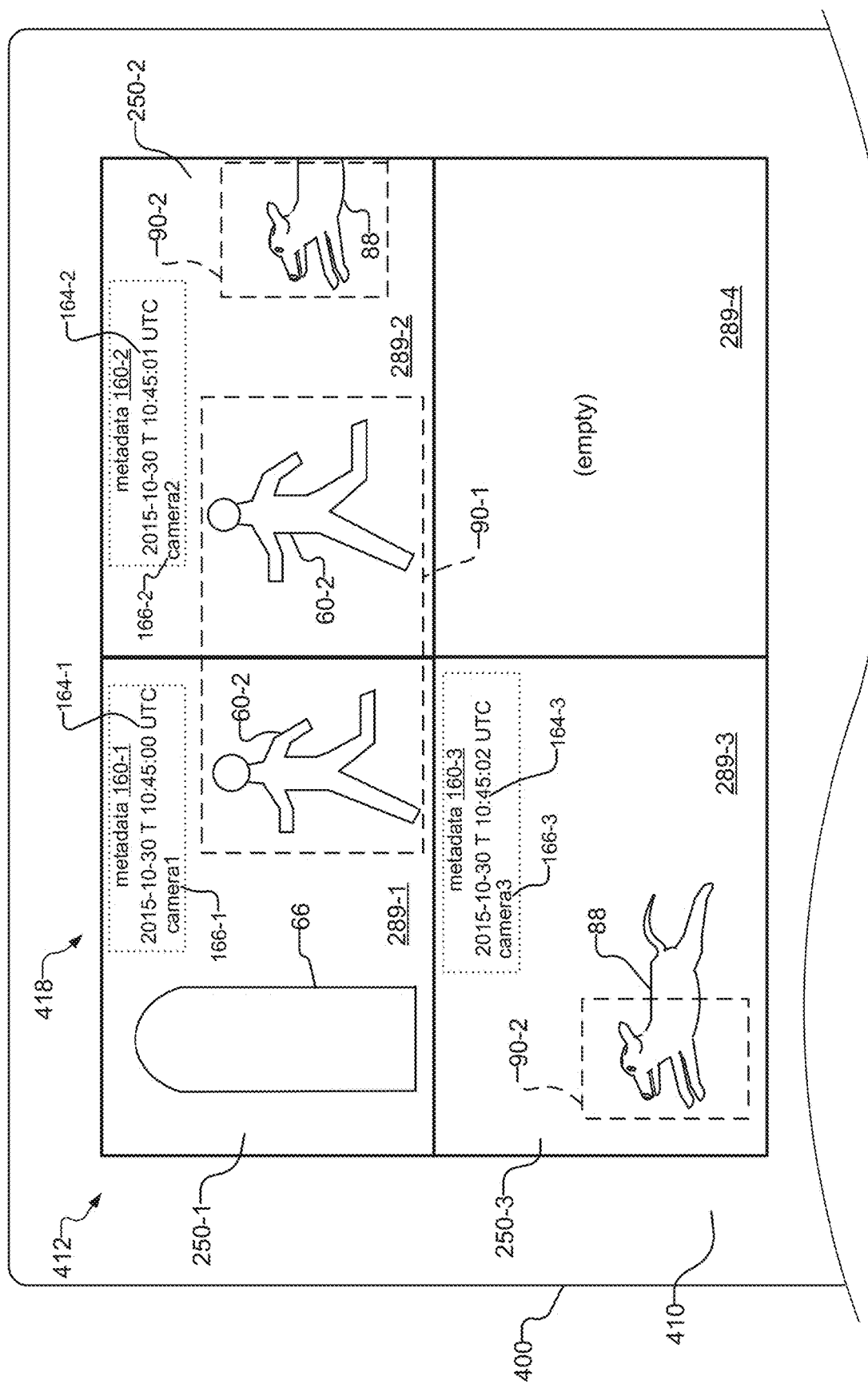
FIG. 12 shows an exemplary intelligent display grid created by the analytics system in the method of FIG. 10 that includes overlapping frames of image data, where the image data is representative of the fields of view of the cameras in FIG. 8A-8C, and where the intelligent display grid is presented for display on the mobile computing device for enabling an operator to obtain an "at a glance" determination of overlap among the fields of view of the surveillance cameras.

FIG. 12 shows an image representation of an intelligent display grid 418 rendered on a display screen 410 of a user device 400 in accordance with the method of FIG. 10. The intelligent display grid 418 enables the installer or operator 60 to have an "at a glance" visual indication of instances of overlap 90-1 and 90-2 within the image data 250 and therefore an indication of overlap 90-1/90-2 associated with fields of view 105 of the cameras 103.

The intelligent display grid 418 includes panes 289. Each of the panes 289 can include image data 250, where the image data 250 is provided by the analytics system 223 in accordance with the overlap detection methods of FIG. 9 and FIG. 10. The image data 250 displayed in the panes 289 are formatted by the analytics system 223 into frames to enable a visual representation of the image data 250 within the panes 289. Metadata 160-1 through 160-3 for each of the frames of image data 250-1 through 250-3 are optionally displayed within panes 289-1 through 289-3, respectfully, of the intelligent display grid 418. Pane 289-4 is included within the display grid 418 to provide a symmetric visual presentation of the grid 418 but does not include any image data 250.

With reference to the method of FIG. 10 and image data 250-2 and 250-1, in one example, the analytics system 223 infers overlap 90-1 among frames of image data 250-2/250-1 by first detecting motion in the image data 250-2/250-1 associated with individual 60-2, and generating motion detection events for the detected motion. Then, the analytics system 223 correlates the motion detection events to determine if the events occurred at substantially the same time. Here, because the value of timestamp 164-2 for image data 250-2 of camera2 is only one second greater than the timestamp 164-1 for image data 250-1 of camera1, the analytics system 223 can infer that the correlated motion detection events are likely related. As a result, the analytics system 223 includes the image data 250-1 and 250-2 in the intelligent display grid 418 to provide a visual indication of the overlap 90-1 between the image data 250-1/250-2, and therefore to provide a visual indication of overlap 90-1 among associated fields of view 105-1/105-2 of camera1 103-1 and camera2 103-2, respectively.

With reference to the method of FIG. 10 and image data 250-3 and 250-2, in another example, the analytics system 223 infers overlap 90-2 among frames of image data 250-3/250-2 by first detecting motion in the image data 250-3/250-2 associated with individual 60-2 and/or dog 88, and generating motion detection events for the detected motion. Then, the analytics system 223 correlates the motion detection events to determine if the events occurred at substantially the same time. Here, because the value of timestamp 164-3 for image data 250-3 of camera3 is only one second greater than the timestamp 164-2 for image data 250-2 of camera2, the analytics system 223 can infer that the correlated motion detection events are likely related. As a result, the analytics system 223 includes the image data 250-3 and 250-2 in the intelligent display grid 418 to provide a visual indication of the overlap 90-2 between the image data 250-2/250-3, and therefore to provide a visual indication of overlap 90-2 among associated fields of view 105-2/105-3 of camera2 103-2 and camera3 103-3, respectively.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining relationships between fields of views of surveillance cameras, the method comprising:
   a mobile user device receiving image data from the surveillance cameras and defining a path within an area monitored by the surveillance cameras; and
   the mobile user device analyzing the image data to determine the relationships between the fields of views of the surveillance cameras by correlating motion among the image data during the defining of the path and determining whether an operator of the mobile user device is included in the image data from at least one of the surveillance cameras for determining deadzones between the surveillance cameras,
   wherein the mobile user device executes a user app that sends pairing requests to the surveillance cameras to establish a communications session with each of the surveillance cameras and presents user interface buttons on a screen of the mobile user device to start and stop definition of the path within the area monitored, and in response to selection of one of the user interface buttons on the user interface of the user app by the operator, the user app starts a local timer and sends an instruction to the surveillance cameras to indicate start of definition of the path and collects position information as the user device is moved along the path.

2. The method of claim 1, further comprising the mobile user device determining overlap between the fields of views of the surveillance cameras.

3. The method of claim 1, further comprising the mobile user device determining deadzones between the fields of views of the surveillance cameras.

4. The method of claim 1, wherein correlating motion among the image data during the defining of the path comprises determining whether the operator of the mobile user device is included in the image data from at least two of the surveillance cameras for determining overlap between the surveillance cameras.

5. The method of claim 1, wherein in response to the mobile user device analyzing the image data for determining the relationships between the fields of views of the surveillance cameras, repositioning the surveillance cameras to adjust overlap between the fields of views of the surveillance cameras.

6. The method of claim 1, wherein in response to the mobile user device analyzing the image data for determining the relationships between the fields of views of the surveillance cameras, repositioning the surveillance cameras to eliminate deadzones between the fields of views of the surveillance cameras.

7. The method of claim 1, wherein in response to the mobile user device analyzing the image data for determining the relationships between the fields of views of the surveillance cameras, changing a lens setting of the surveillance cameras to adjust overlap between the fields of views of the surveillance cameras.

8. The method of claim 1, wherein in response to the mobile user device analyzing the image data for determining the relationships between the fields of views of the surveillance cameras, changing a zoom setting of the surveillance cameras to eliminate deadzones between the fields of views of the surveillance cameras.

9. The method as claimed in claim 1, wherein the position information is obtained from an inertial system in the user device.

10. The method as claimed in claim 1, wherein the cameras, in response to receiving the instruction from the user app, capture image data while the user app collects position information along the path.

11. The method as claimed in claim 10, further comprising the surveillance cameras each sending time-stamped image data captured during the definition of the path to the user device.

12. The method as claimed in claim 11, wherein mobile user device analyzing the image data further comprises the mobile user device tracking operator through the image data from the surveillance cameras and locating deadzones based on the position information and absence of the operator within the image data over a time interval determined with reference to the time-stamped image data.

13. The method as claimed in claim 1, further comprising the mobile user device generating a map and including shaded areas within the map for areas where the operator was not included in the image data of any of the surveillance camera, the shaded areas being areas between views provided by the surveillance cameras corresponding to the deadzones, and the user app displaying the map on the screen of the user device.

14. A surveillance camera system, comprising:
   a mobile user device for defining a critical path;
   surveillance cameras capturing image data along the critical path; and
   an analytics system of the mobile user device determining overlap of fields of view of the surveillance cameras from the image data and determining deadzones between the fields of view of the surveillance cameras from the image data,
   wherein the mobile user device executes a user app that sends pairing requests to the surveillance cameras to establish a communications session with each of the surveillance cameras and presents user interface buttons on a screen of the mobile user device to start and stop definition of the critical path within an area monitored by the surveillance cameras, and in response to selection of one of the user interface buttons on the user interface of the user app by the operator, the user app starts a local timer and sends an instruction to the surveillance cameras to indicate start of definition of the path and collects position information as the user device is moved along the critical path.

15. The system as claimed in claim 14, wherein the position information is obtained from an inertial system in the user device.

16. The system as claimed in claim 14, wherein the cameras, in response to receiving the instruction from the user app, captures image data while the user app collects position information along the critical path.

17. The system as claimed in claim 16, wherein the surveillance cameras each send time-stamped image data captured during the definition of the critical path to the user device.

18. The system as claimed in claim 17, wherein analytics system analyzes the image data to track the operator through the image data from the surveillance cameras and to locate the deadzones based on the position information and absence of the operator within the image data over a time interval determined with reference to the time-stamped image data.

19. The method as claimed in claim 14, further comprising the mobile user device generating a map and including shaded areas within the map for areas where the operator was not included in the image data of any of the surveillance camera, the shaded areas being areas between views provided by the surveillance cameras corresponding to the deadzones, and the user app displaying the map on the screen of the user device.

* * * * *